United States Patent
Shih (10) Patent No.: US 10,063,780 B2
(45) Date of Patent: Aug. 28, 2018

(54) ELECTRONIC IMAGING SYSTEM FOR CAPTURING AND DISPLAYING IMAGES IN REAL TIME

(71) Applicant: Shan-Le Shih, New Taipei (TW)

(72) Inventor: Shan-Le Shih, New Taipei (TW)

( * ) Notice: Subject to any disclaimer, the term of this patent is extended or adjusted under 35 U.S.C. 154(b) by 147 days.

(21) Appl. No.: 15/298,780

(22) Filed: Oct. 20, 2016

(65) Prior Publication Data

US 2017/0041551 A1    Feb. 9, 2017

Related U.S. Application Data (63) Continuation-in-part of application No. 13/512,784, filed as application No. PCT/CN2010/073478 on Jun. 2, 2010.

(51) Int. Cl.
| | |
|---|---|
| H04N 5/232 | (2006.01) |
| G06T 7/00 | (2017.01) |
| G06T 3/60 | (2006.01) |
| H04N 7/00 | (2011.01) |
| H04N 7/18 | (2006.01) |

(52) U.S. Cl.
CPC ........... *H04N 5/23293* (2013.01); *G06T 3/60* (2013.01); *G06T 7/004* (2013.01); *H04N 7/005* (2013.01); *H04N 7/18* (2013.01)

(58) Field of Classification Search
CPC ...... H04N 5/23293; H04N 7/18; H04N 7/005; G06T 3/60
See application file for complete search history.

(56) References Cited

U.S. PATENT DOCUMENTS

| | | | |
|---|---|---|---|
| 5,550,588 A * | 8/1996 | Hayashi | ................. H04N 7/142 348/231.99 |
| 5,969,773 A | 10/1999 | Im | |
| 7,443,417 B1 | 10/2008 | Heinrich | |
| 2004/0010679 A1 | 1/2004 | Moritz et al. | |
| 2004/0010783 A1 | 1/2004 | Moritz et al. | |
| 2004/0048633 A1* | 3/2004 | Sato | .................... H04M 1/0214 455/556.1 |
| 2005/0270308 A1 | 12/2005 | Obinata | |
| 2005/0280731 A1 | 12/2005 | Lee | |
| 2006/0007303 A1 | 1/2006 | Milton | |
| 2007/0040033 A1 | 2/2007 | Rosenberg | |
| 2007/0069977 A1 | 3/2007 | Adderton | |
| 2007/0150763 A1 | 6/2007 | Yang et al. | |

(Continued)

FOREIGN PATENT DOCUMENTS

| | | |
|---|---|---|
| CN | 101296356 A | 10/2008 |
| JP | 2009-284361 A | 12/2009 |

*Primary Examiner* — Jason A Flohre (74) *Attorney, Agent, or Firm* — Muncy, Geissler, Olds & Lowe, P.C.

(57) ABSTRACT

An electronic imaging system for capturing and displaying the images in real time is disclosed, which includes a controller, a display device and a left to right mirror module. The controller has a camera lens and a transmission unit. The camera lens can capture the image signals. The transmission unit transmits the captured image signals. The display device has a receiving unit and a display unit. The receiving unit receives the image signal from the transmission unit of the controller, and the display unit displays the images received in real time. The left to right mirror module is used to mirror the image signal, which is then displayed on the display device.

10 Claims, 11 Drawing Sheets

(56) References Cited

U.S. PATENT DOCUMENTS

| | | |
|---|---|---|
| 2008/0174682 A1 | 7/2008 | Faisman et al. |
| 2008/0278618 A1 | 11/2008 | Matsumoto et al. |
| 2009/0147081 A1 | 6/2009 | Hanson |
| 2009/0303320 A1 | 12/2009 | Davis |
| 2010/0186234 A1 | 7/2010 | Binder |
| 2011/0018985 A1 | 1/2011 | Zhu |
| 2011/0298929 A1 | 12/2011 | Garcia et al. |
| 2012/0005459 A1 | 1/2012 | Fleischman et al. |
| 2015/0253873 A1* | 9/2015 | Sato ................... G06F 3/0346 345/156 |
| 2015/0373264 A1* | 12/2015 | Anzue ................ H04N 5/23293 348/333.05 |

* cited by examiner

ELECTRONIC IMAGING SYSTEM FOR CAPTURING AND DISPLAYING IMAGES IN REAL TIME

CROSS REFERENCE TO RELATED APPLICATIONS

This application is a Continuation-in-Part of co-pending application Ser. No. 13/512,784, filed on 30 May 2012, which is the National Stage of International Application No. PCT/CN2010/073478, filed on 2 Jun. 2010, the entire contents of all of which are hereby incorporated by reference.

BACKGROUND OF THE INVENTION

1. Field of the Invention

The present invention relates to an electronic imaging system, and more particularly to an electronic imaging system that can capture and display the images in real time.

2. The Prior Arts

As the scientific technology develops, the electronic imaging techniques are quickly advanced, and however, the prices become cheaper. The various electronic imaging devices, such as the cameras, or the displays, are widely used in many applications. People can have a good life by viewing the lively moving images.

In the applications of the electronic imaging techniques, it is important that the images can be captured and displayed in real time. The user can capture the moving images, and display the captured images on the display device in real time through the data transmission during the daily life activities or the work, so that the user or other people can obtain the state of the user or the message in real time.

In one example, the image capturing device can capture the appearance of a user for display, so that the user can view his/her own image on the display device in real time. Accordingly, the user can view and arrange his/her own appearance.

In another example, some cars may be provided with a camera lens to capture a rear view for facilitating the driver to drive the vehicle back.

Currently available conventional devices mostly employ processors, which may implicitly present the defect of significant power consumption. For example, in patents such as US20040010679, US20040010783, US20070150763 and recent US20120005459 etc., it can be observed that the processors possibly encounter an issue in terms of power consumption. Moreover, high production costs and requirement of conjunctive registry memories for such processors may be the drawbacks as well. The following prior arts also utilize processors or alternatively demonstrate certain backward characteristics that they are unable to achieve the technology of the present invention:

US2009/0147081:

(a) It requires two lenses and conjunctive special display devices to display a reversed, or mirror, image: 1 reverse lens, 2 general lens.

Drawback: use of one extra lens, increased costs, lack of economical advancement.

(b) No control device for mirroring/non-mirroring switches.

Drawback: More required manual lens switch steps, less convenience from direct switches offered by the present invention.

US 2007/0069977:

(a) It employs images from two fixed lenses: one for positive lens, one mirroring lens.

Drawback: the photographed object needs to veer or move in alignment with the lens.

(b) Two lenses are needed to transfer mirroring/non-mirroring images: 1 mirroring lens, 2 general lens.

Drawback: using one additional lens may caused increased cost, lack of economical advancement.

(c) Applying processor(s) to operate non-disclosed corresponding programs.

Drawback: power consumption issues, and those skilled ones in this art may be unable to replicate the patent.

US2007/0040033:

(a) Utilizing one lens fixed onto the screen frame.

Drawback: the photographed object may need to veer or move in alignment with the lens.

(b) Applying processor(s) to operate non-disclosed corresponding programs.

Drawback: power consumption issues, and those skilled ones in this art may be unable to replicate the patent.

(c) Using verbal control to manipulate processor(s) for image processes.

Drawback: upon taking pictures at the user's back, since the eyes can not see the screen, the patent applies the verbal control technology to control processor(s) to freeze the image (like a static picture), it is impossible to synchronously mirror and organize the images of the appearance on certain portions of the body, e.g., the back or chin (capturing images from lower side to upper side), and the mute and deaf disabilities may not be able to operate this technology.

Although the prior art mentioned above is not a new concept, the people can have a new experience. Because the prices of the electronic devices become cheaper, the different amounts of the various-sized display devices are disposed on the building walls, indoor, transportation vehicles, elevators, etc. As the photography equipments are miniaturized, the portable photography equipments are quite popular, which bring more convenience to the users.

A convenience to the users is very important. The currently available real-time monitors are usually non-portable. On the other hand, the conventional handheld cameras are complicated to be operated, and are not used in the aforementioned (arrange appearance) applications. Moreover, the image capturing devices and the display devices are separate devices, and the integration of the image capturing devices and the display devices may have compatibility problems. More particularly, when the camera is used for arranging one's appearance, the image captured by the camera is reversed when the image is displayed. It is more convenient that the actual image can be viewed if the image captured by the camera is left to right mirrored.

Accordingly, there are many problems in the prior art needed to be solved.

SUMMARY OF THE INVENTION

One objective of the present invention is to provide an electronic imaging system for capturing and displaying the images in real time. An integrated display system is used to facilitate the arrangement of one's appearance so that a controller and a display device are more valuable.

Another objective of the present invention is to provide an electronic imaging system for capturing and displaying the images in real time, which is easily installed, for example, at the living room of home, in transportation vehicles, or elevators. The images captured by the camera of the controller can be displayed at any sites installed with the display screen which is connected to the camera. No compatibility problems thus will occur for use.

Another objective of the present invention is yet to provide an electronic imaging system for capturing and displaying the images in real time. The displayed image can be left to right mirrored, which is controlled by a controlling unit for the convenience of the user.

In order to achieve the above objectives of the present invention, an electronic imaging system for capturing and displaying the images in real time is provided, which comprises a controller, a display device, and a left to right mirror module. The controller has a camera lens and a transmission unit. The camera lens can capture the image signals. The transmission unit transmits the captured image signals. The display device includes a receiving unit and a display unit, wherein the receiving unit receives the image signal transmitted from the transmission unit, and the display unit displays the images received in real time. The left to right mirror module mirrors the captured image signal to be displayed on the display device.

The image signal is transmitted from the transmission unit to the receiving unit by wireless transmission or wire transmission. The left to right mirror module can be installed in the controller, or the display device, and controlled by a hardware system or software system.

The controller has a plurality of controlling units to control the camera lens and the left to right mirror module. The controlling units can be buttons, rotary knobs, or levers.

The advantages of the present invention are listed as bellow:

(1) Through the left to right mirror module, the image of the user can be mirrored for the convenience of arranging his/her appearance.

(2) The electronic imaging system is easily installed, for example, at the living room of home, in transportation vehicles, or elevators. The images captured by the camera of the controller can be displayed at any sites installed with the display screen which is connected to the camera. No compatibility problems thus will occur for use.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENTS

Figure 1:
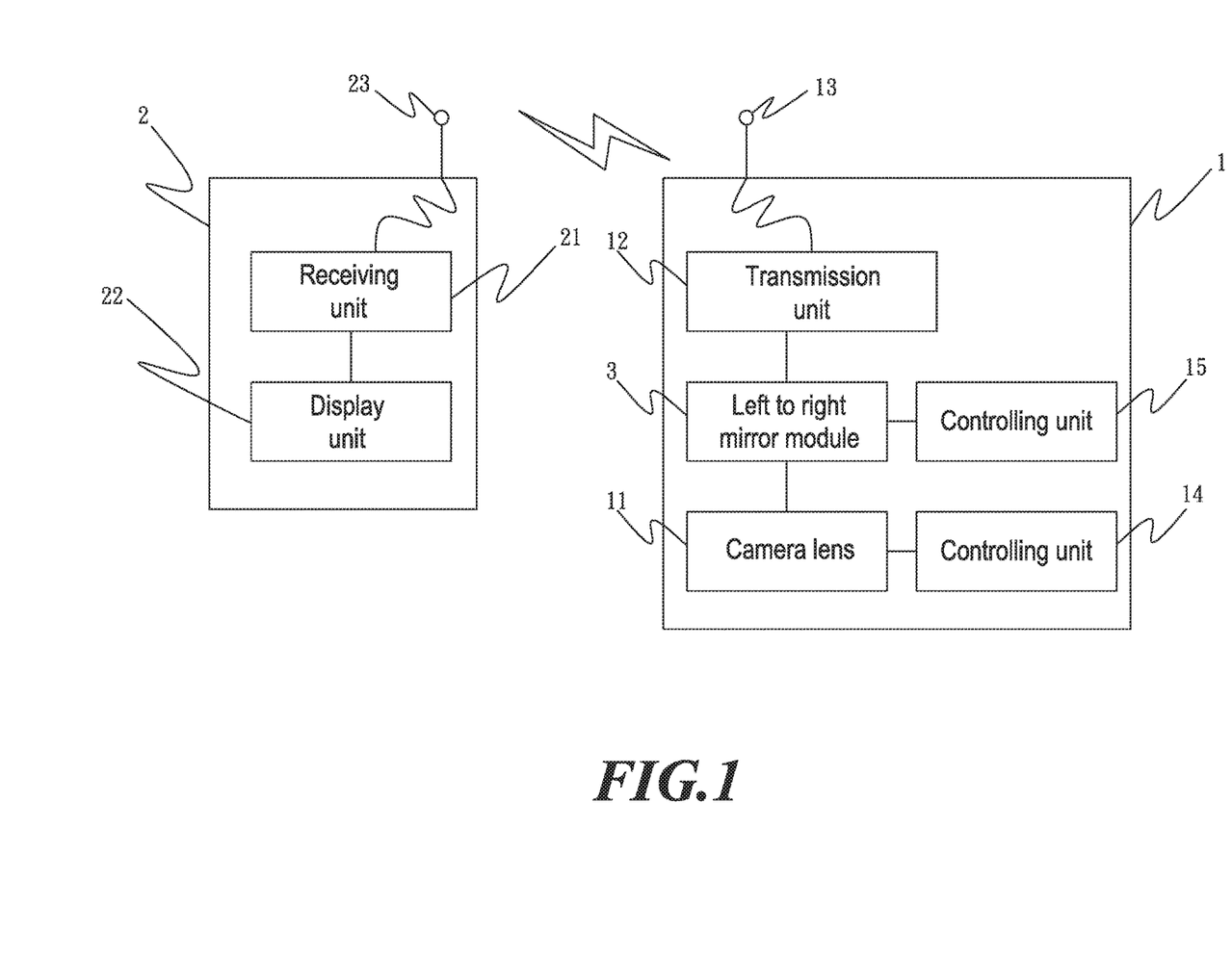
FIG. 1 is a structure block diagram according to one embodiment of the present invention.
Figure 2:
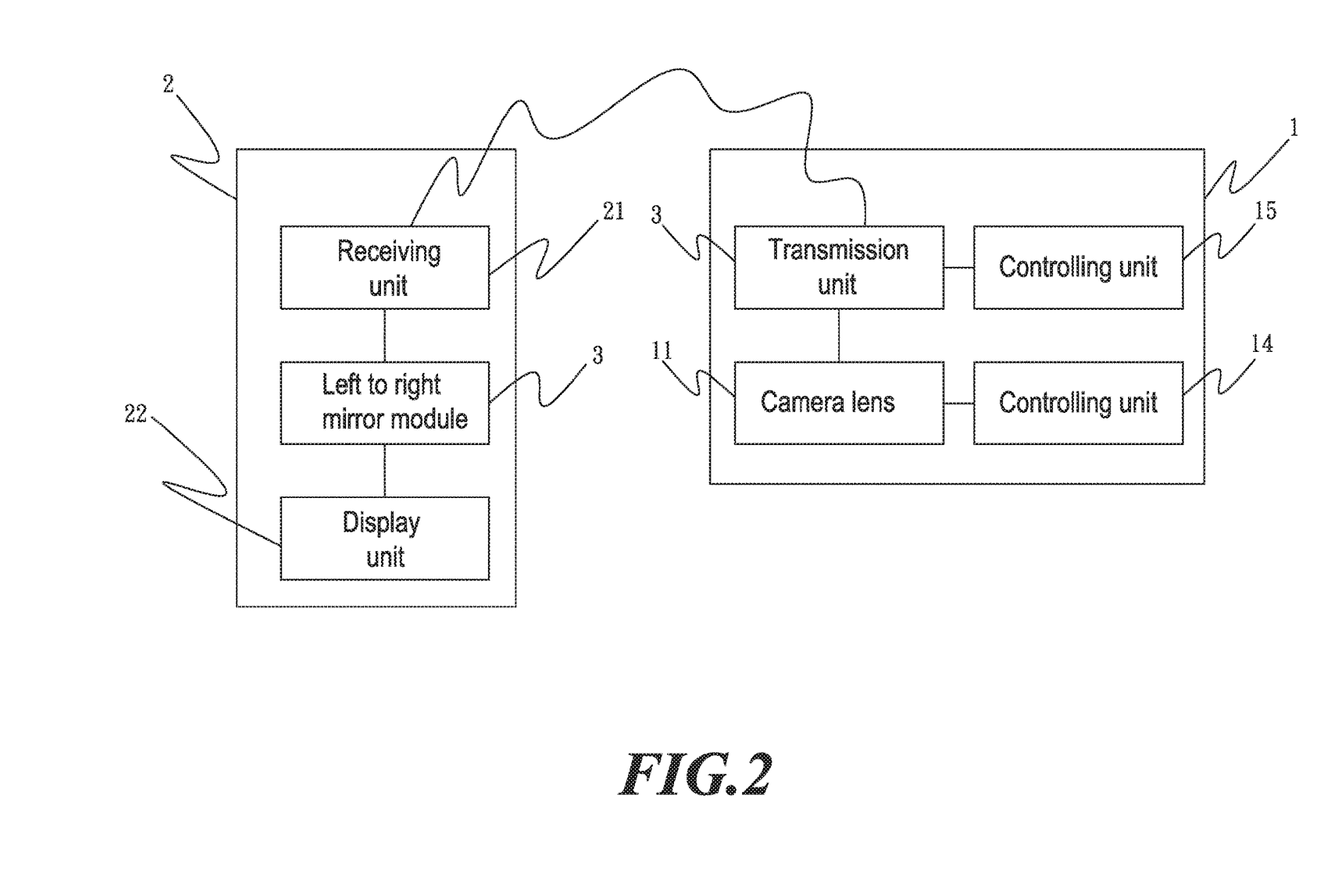
FIG. 2 is a structure block diagram according to another embodiment of the present invention.

FIGS. 1 and 2 are the structure block diagrams of an electronic imaging system for capturing and displaying the images in real time. The electronic imaging system includes a controller 1, a display device 2, and a left to right mirror module 3.

The controller 1 has a camera lens 11 and a transmission unit 12. The cameral lens 11 can capture an image signal, and the image signal can be sent out in real time through the transmission unit 12.

The display device 2 has a receiving unit 21 and a display unit 22. The receiving unit 21 receives the image signals from the transmission unit 12 of the controller 1, and the received image will be displayed on the display unit 22 in real time.

The left to right mirror module 3 performs a left to right mirroring on the image signal captured by the camera lens 11, and then the mirrored image is displayed on the display device 2.

As shown in FIG. 1, the image signal can be transmitted from the transmission unit 12 to the receiving unit 21 by wireless transmission. Wireless transmission can be infrared transmission, Wi-Fi transmission, Bluetooth, modulated frequency, and micro-wave, which have the function of the wireless data transmission. The antennae 13 and 23 can be provided in compliance with the wireless transmission used between the transmission unit 12 and the receiving unit 21. The antennae 13 and 23 can be built in the controller 1 or the display device 2, and can also be extended outside of the controller 1 or display device 2.

As shown in FIG. 2, the image signal can be transmitted from the transmission unit 12 to the receiving unit 21 by wire transmission. The wire transmission can be implemented through serial ports, parallel ports, or network lines.

The left to right mirror module 3 can be installed in the controller 1 or the display device 2. The left to right mirror module 3 is controlled by a hardware system or a software system for left to right mirroring the image signal.

Figure 3:
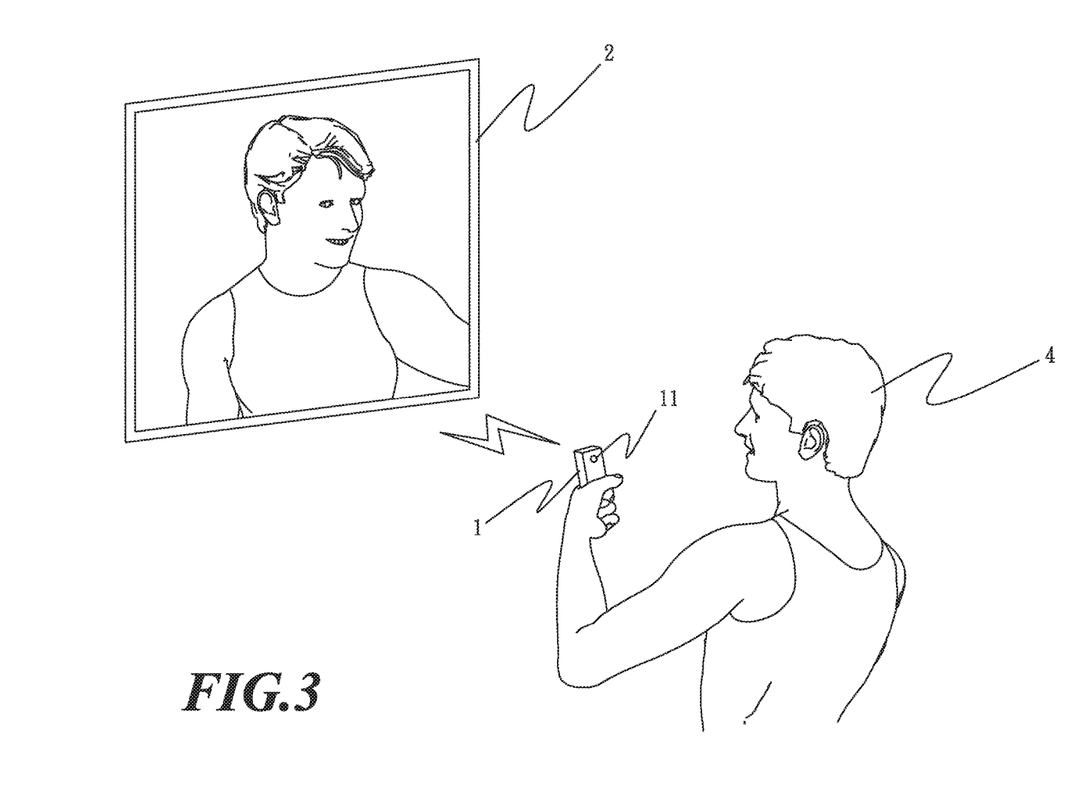
FIG. 3 is a schematic view showing that the front image of the user is captured according to the present invention.
Figure 4:
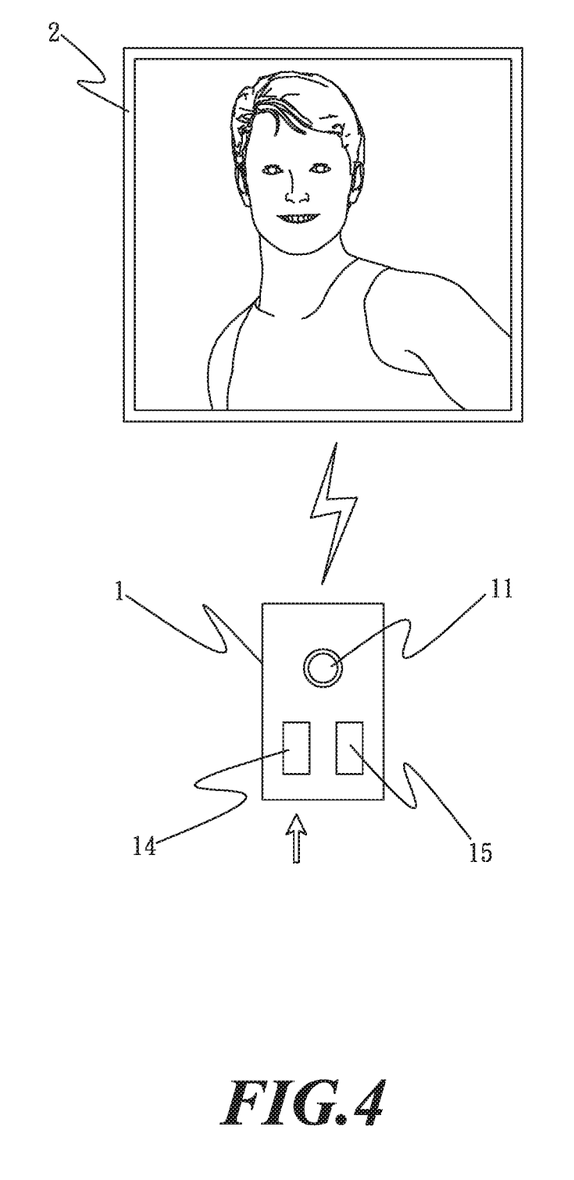
FIG. 4 is a schematic view showing that the front image of the user is displayed according to the present invention.
Figure 5:
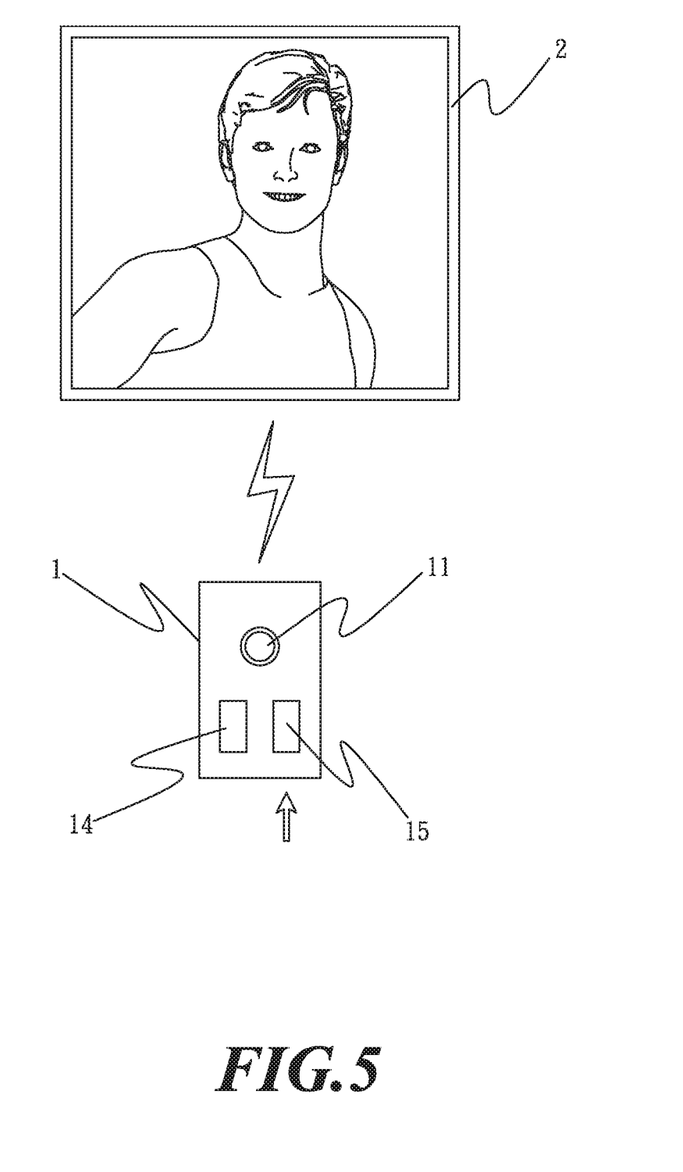
FIG. 5 is a schematic view showing that the front image of the user is left to right mirrored according to the present invention.

As shown in FIGS. 3-5, the present invention is emphasized on the image reflection. When a user 4 wants to arrange his/her appearance at a site (for example, before a television set) equipped with an electronic imaging system of the present invention, the portable controller 1 is connected to the display device 2. The face can be captured by the camera lens 11 of the controller 1, and then captured image signal of the user's face is transmitted to the display device 2. The user 4 thus can watch the display device 2 to arrange his/her appearance. The user 4 can also desirably adjust the position of the camera lens 11 to look at the other parts. The captured image of the user's face is laterally reversed on the display device 2, which may cause some problem to the user 4 when look at his/her image. Through the left to right mirror module 3, the displayed image can be left to right mirrored for the convenience of viewing the appearance of the user.

The controller 1 is provided with the controlling units 14 and 15 to respectively control the camera lens 11 and the left to right mirror module 3. The controlling units 14 and 15 include buttons, rotary knobs, and levers. As shown in FIG. 4, the user 4 can operate the camera lens 11 through the controlling unit 14 so that his front image is captured. As shown in FIG. 5, after the front image of the user 4 is displayed on the display device 2, the front image is left to right mirrored through the left to right mirror module 3 which is controlled by the controlling unit 15.

Figure 6:
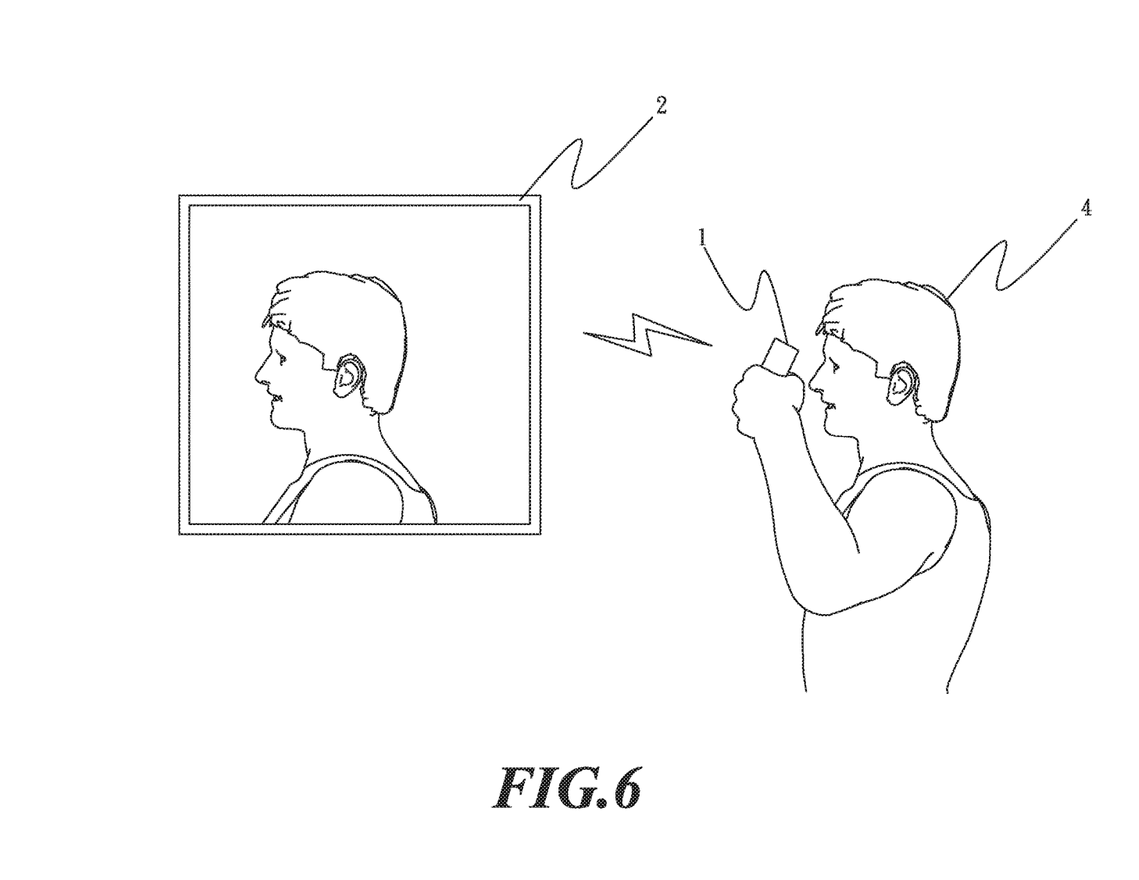
FIG. 6 is a schematic view showing that the side image of the user is displayed according to the present invention.
Figure 7:
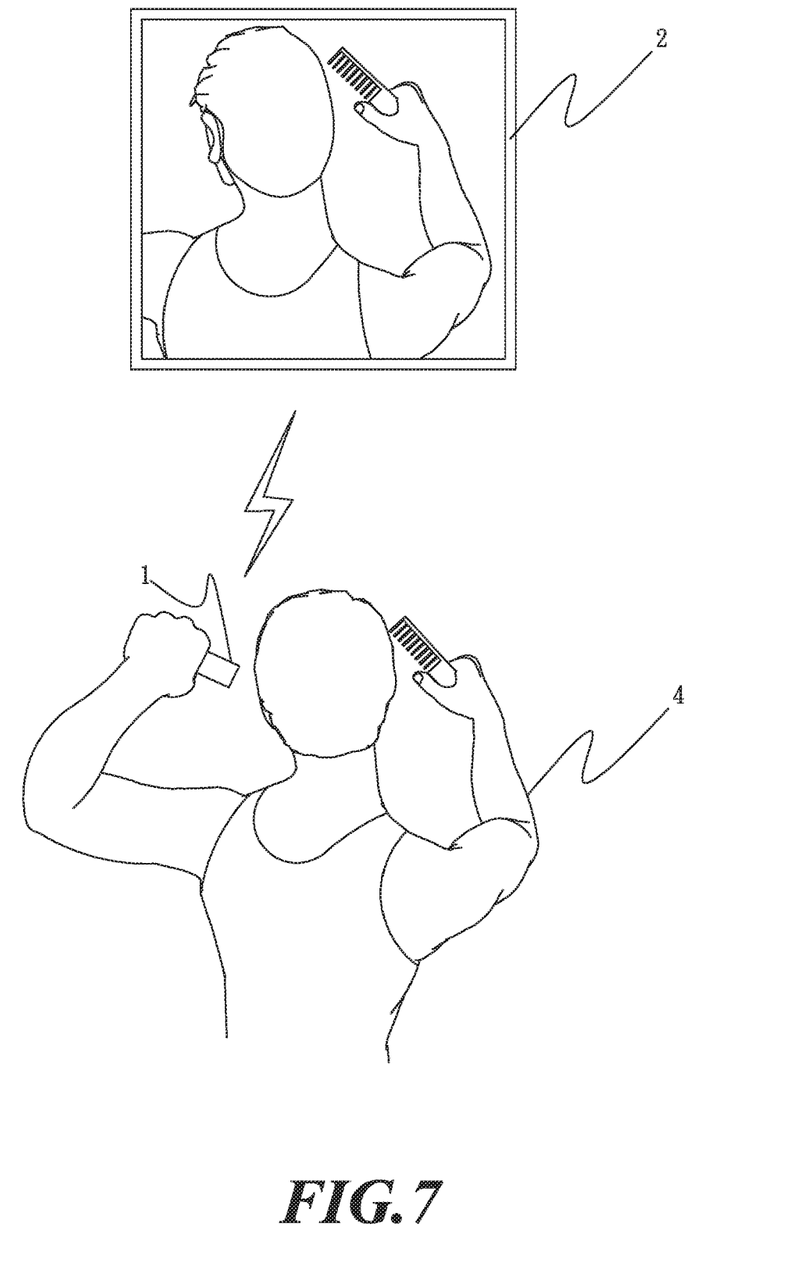
FIG. 7 is a schematic view showing that the rear image of the user is displayed according to the present invention.

Referring to FIGS. 6 and 7, the side or the rear image of the user 4 can also be captured. As shown, because the directions of the displayed image and the actual image are the same, the user 4 will not feel it inconvenient when viewing his/her image. Accordingly, there is no need to operate the left to right mirror module 3. In other words, the user may have the option to use or not use the left to right mirror module 3.

Then, referring conjunctively to FIGS. 1, 8A, 8B and 8D, since the left to right mirror module 3 employs the array divider (the "divider" hereinafter) and subtractor for operations, it is unnecessary to use processors. The left to right mirror module 3 further includes a first mirror module 31 and a second mirror module 32, wherein the first mirror module 31 further has a divider 311, a switch 312 and a subtractor 313, and the second mirror module 32 further has a divider 321; in addition, the image signal includes a total number of horizontal orientation pixels (w), a total number of vertical orientation pixels (h), an arbitrary pixel horizontal coordinate (x) and an arbitrary pixel vertical coordinate (y), wherein the divider 311 in the first mirror module 31 receives image signals photographed by the camera lens 11, and the received image signal includes the arbitrary pixel horizontal coordinate (x) and the total number of horizontal orientation pixels (w) such that the divider 311 divides the arbitrary pixel horizontal coordinate (x) with the total number of horizontal orientation pixels (w) (i.e., the formula x/w), and then transfers the processed image signal to the switch 312 which, upon receiving the signal indicating the performance of left to right image mirroring from the controlling unit 15, sends the image signal processed by the divider 311 to the subtractor 313 for the subtraction operation and subsequently further transfers to the display device 2 via the transmission unit 12 for displaying, so that the rendered image thus processed can be the left to right mirror image. On the other hand, in case the switch 312 did not receive the signal from the controlling unit 15, the image signal without left to right mirroring can be directly outputted to the display device 2 by way of the transmission unit 12 for displaying. Moreover, the second mirror module 32 includes a divider 321, so that, after the second mirror module 32 receives the image signal, it will perform the "arbitrary pixel vertical coordinate (y)/total number of vertical orientation pixels (h)" (i.e., the formula y/h), and then send to the display device 2 for rendering, so the image shown on the display device 2 is not up-down mirrored.

Figure 8A:
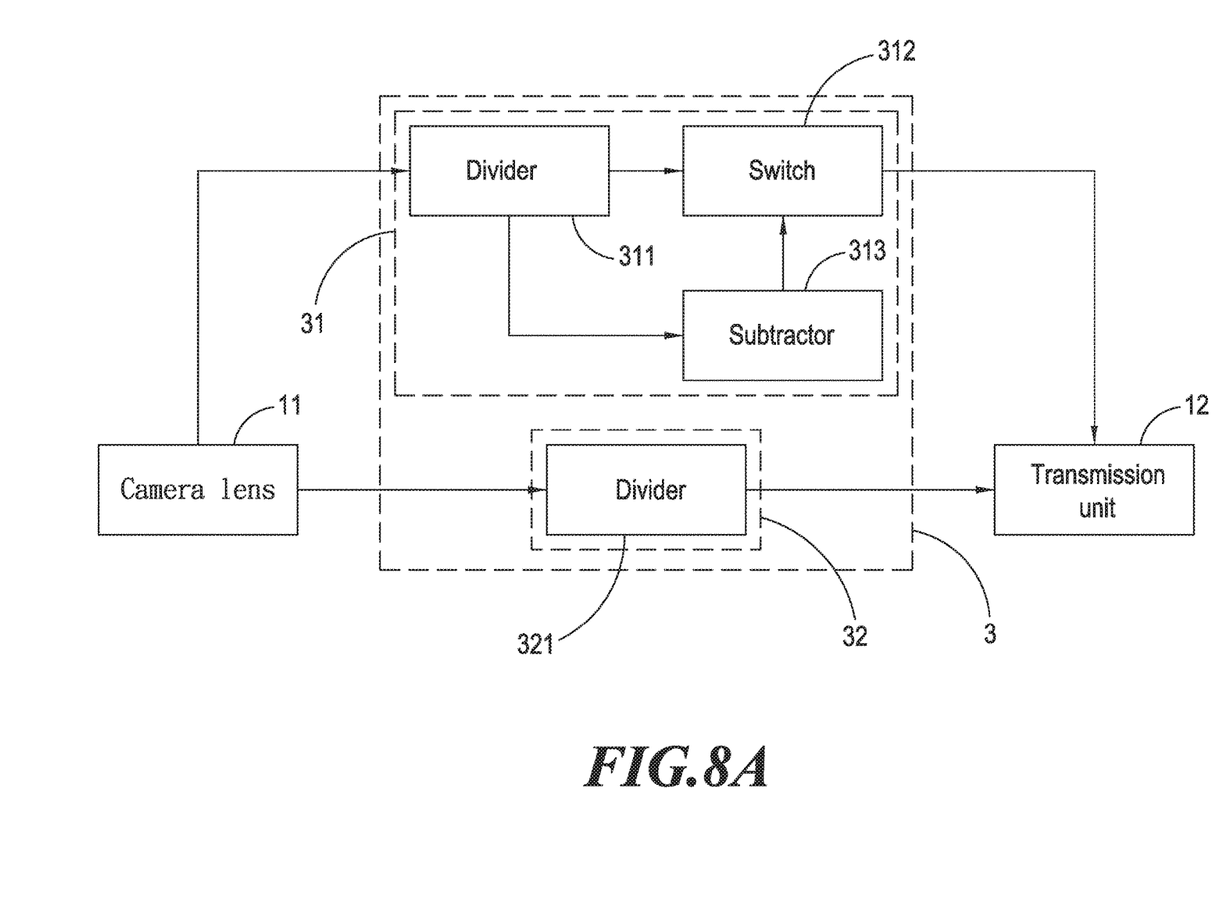
FIG. 8A is a structure block diagram for the divider and subtractor in the left to right mirror module according to the present invention.
Figure 8B:
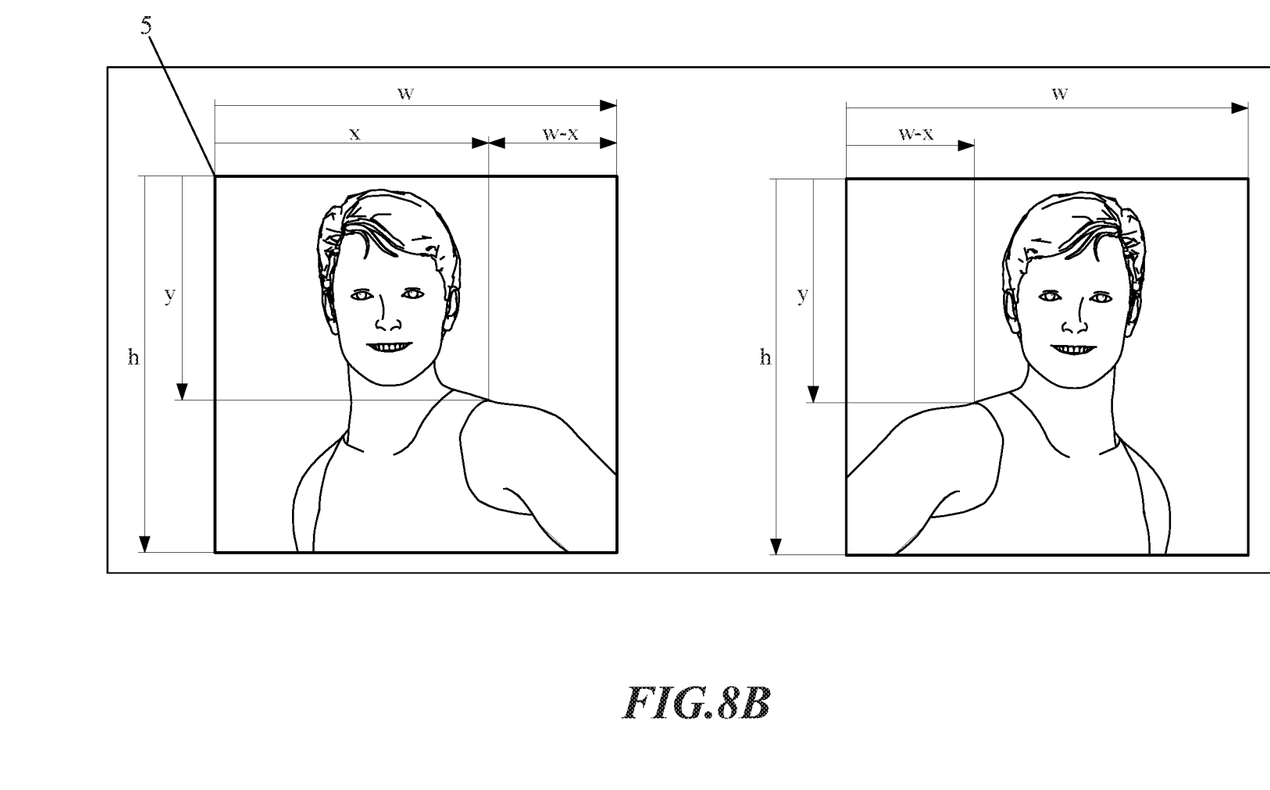
FIG. 8B is a schematic view illustrating the image coordinate conversion according to the present invention.

Refer next to FIG. 8B, wherein a schematic view illustrating the image coordinate conversion according to the present invention is shown. It can be seen that the image signal is captured by a digital camera, and the left view illustrates the photographic result by means of a general lens and the right view demonstrates the result after the left to right mirroring process. Herein, a coordinate base point 5 is defined at the upper left corner, then sequentially scanning the brightness and color of each pixel and recording the coordinate of the pixel; therefore, taking the left view of FIG. 8B as an example, the width of a general lens is the total number of horizontal orientation pixels (w) and the height thereof is the total number of vertical orientation pixels (h), while the coordinates of any arbitrary pixel thus sequentially scanned (e.g., scanning to a point on the shoulder of a human image) can be an arbitrary pixel horizontal coordinate (x) and an arbitrary pixel vertical coordinate (y), respectively.

Next, to illustrate the left to right mirror module 3 at the lens controller end, since it is unnecessary to process in the y direction, it needs only to send out the ratio of the pixel coordinate on the y axis (i.e., y/h). However, in the x direction (i.e., the horizontal width direction), it has to determine based on whether the left to right mirroring is performed; in other word, suppose it is required to transfer a general lens signal, then the ratio of the pixel coordinate on the x axis (i.e., x/w) can be sent; but, if it needs to transfer a left to right mirror image, then, for the base point 5 at the upper left corner, it will send a signal indicating the ratio of the width "w" minus the coordinate "x" over the "w", thus obtaining the following process formula for the divider and the subtractor in the first mirror module 31:

$$(w-x)/w = (1-x/w)$$

Upon transferring the aforementioned pixel sequential scanning results to the display device 2, because the resolutions of the display device 2 (i.e., the total numbers of pixels in both the w and h directions) may differ, the display device 2 can, using the pixel ratios received by the controller 1, multiply the total pixel numbers U, V of the display device 2 respectively in the w and h directions thereby creating the zooming in (or zooming out) effect so as to project all of the received pixels fully onto the display device at an equivalent scale. It should be noticed that the technology for scale zooming in or zooming out in the display device is well-known in the art thus the descriptions thereof are omitted for brevity.

Figure 8C:
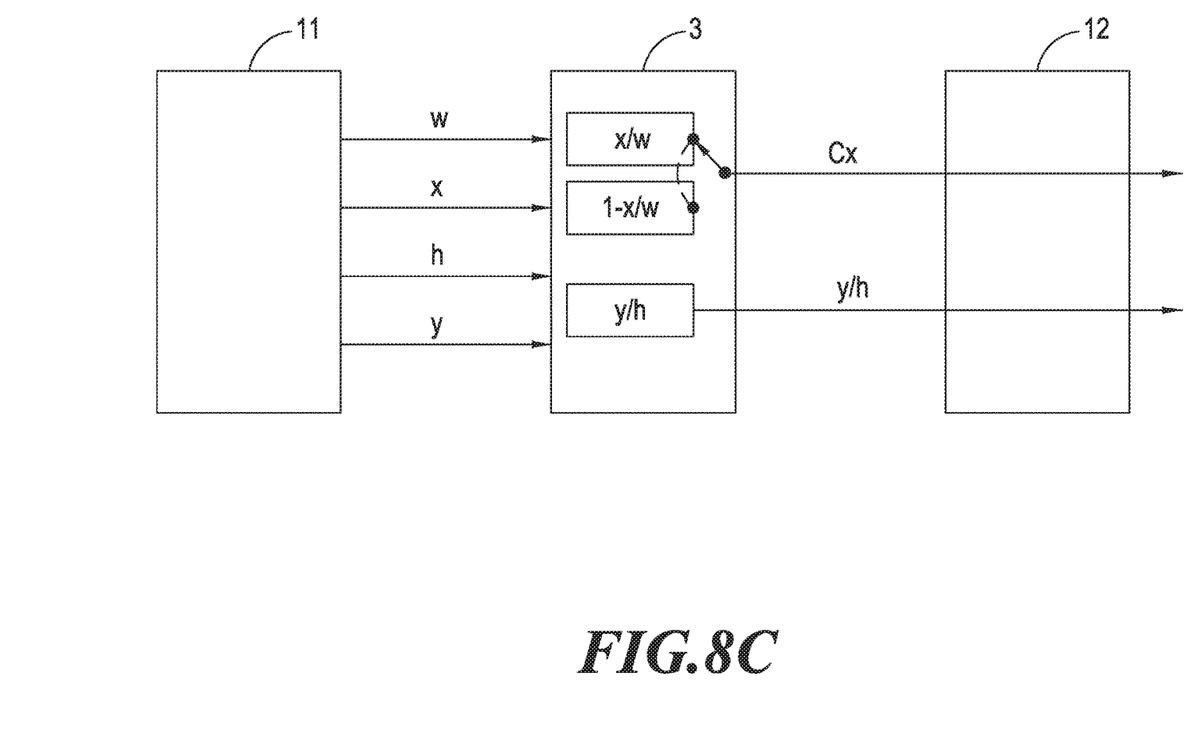
FIG. 8C is an internal structure block diagram for the left to right mirror module according to the present invention.

Refer next to FIGS. 8A and 8C, wherein, for all image pixel coordinate (x Direction, y Direction) parameters processed by the left to right mirror module 3 (while other parameters, such as brightness, colors etc., may be left unaltered after such image pixel processes in the present invention), the transmission unit 12 will transfer one of the two following coordinate sets to the receiving unit 21 of display device 2 (based on the switching decision on "Using Mirroring Control" or "Not Using Mirroring Control" from the controlling unit 15):

Suppose the controlling unit 15 controls the switch 312 in the first mirror module 31 to switch to "Using Mirroring Control", the parameters of the image pixel coordinate (x, w Direction, y, h Direction) ratio can be:

$$\left(1 - \frac{x}{w}, \frac{y}{h}\right)$$

On the contrary, when the controlling unit 15 controls the switch 312 in the first mirror module 31 to switch to "Not Using Mirroring Control", the parameters of the image pixel coordinate (x, w Direction, y, h Direction) ratio can be:

$$\left(\frac{x}{w}, \frac{y}{h}\right)$$

Additionally, the display unit 2 will multiply the image coordinate ratio for each pixel received by the receiving unit 21 with the actual width U and actual height V of the display device thus showing at the corresponding pixel location on the display device; that is:

In case the controlling unit 15 controls the switch 312 in the first mirror module 31 to switch to "Using Mirroring Control", the parameters of the image pixel coordinate (x, w Direction, y, h Direction) may be as below:

$$\left(\left(1-\frac{x}{w}\right)*U\cdot\frac{y}{h}*V\right)$$

On the other hand, when the controlling unit controls the switch 312 in the first mirror module 31 to switch to "Not Using Mirroring Control", the parameters of the image pixel coordinate (x, w Direction, y, h Direction) can be like this:

$$\left(\frac{x}{w}*U\cdot\frac{y}{h}*V\right)$$

Figure 8D:
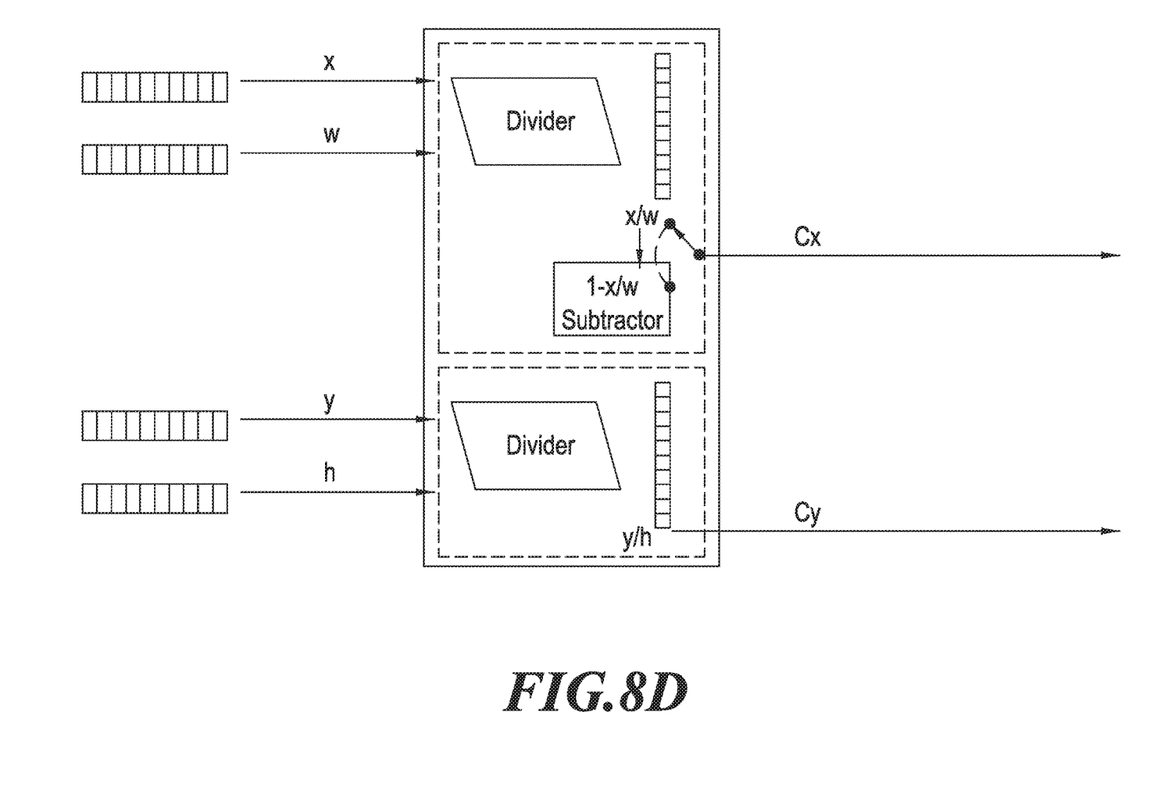
FIG. 8D is an internal structure view for the left to right mirror module according to the present invention.

Consequently, refer to FIGS. 8A and 8D, wherein the divider 311 in the first mirror module 31 executes the "x/w" operation while the subtractor 313 deals with the "1−x/w" operation, and the switch 312 goes down upon using mirroring and goes up when not using mirroring; besides, the divider 321 in the second mirror module 32 takes care of the "y/h" operation.

Furthermore, the above-said dividers 311, 321 are array dividers; meanwhile, the subtractor 313 is a subtractor.

Compared with prior arts, the present invention further provides the following advantages:

The present invention employs only one camera lens and the object to be photographed by the lens needs not to veer or move in alignment with the second additional lens for direct left-right mirror switch, thus achieving the purposes in terms of cost reduction, economical efficiency and convenient operations.

The present invention does not utilize processor(s) to perform operations, so there are no needs to set up additional registry memories and continuously supply electric power for maintaining the data and software programs therein, which may undesirably cause power consumption issues; rather, the present invention uses logical circuits such as dividers and subtractor, in which electric power is supplied only when they actually require for executing operations thereby enabling the effects of power saving and lowered manufacture costs.

The foregoing description is intended to only provide illustrative ways of implementing the present invention, and should not be construed as limitations to the scope of the present invention. While the foregoing is directed to embodiments of the present invention, other and further embodiments of the invention may thus be devised without departing from the basic scope thereof, and the scope thereof is determined by the claims that follow.

What is claimed is:

1. An electronic imaging system for capturing and displaying images in real time, comprising:
   a controller including a camera lens and a transmission unit, the camera lens being used to capture an image signal, the transmission unit transmitting the captured image signal in real time; wherein, the image signal includes a total number of horizontal orientation pixels (w), a total number of vertical orientation pixels (h), an arbitrary pixel horizontal coordinate (x) and an arbitrary pixel vertical coordinate (y);
   a display device including a receiving unit and a display unit, wherein the receiving unit receives the image signal transmitted from the transmission unit in real time, and the display unit displays an image corresponding to the image signal received in real time;
   a left to right mirror module mirroring an image signal to be displayed on the display device, wherein the left to right mirror module comprises a first mirror module and a second mirror module,
      in which the first mirror module includes a first divider, a switch and a subtractor, wherein the first divider receives the image signal captured by the camera lens and processes the image signal by performing an "arbitrary pixel horizontal coordinate (x)/total number of horizontal orientation pixels (w)" operation, the first divider then transfers the processed image signal to the switch, and
      in a case in which the switch receives a signal indicating an execution of image left to right mirroring, the processed image signal from the first divider is sent to the subtractor for processing in which a "1-arbitrary pixel horizontal coordinate (x)/total number of horizontal orientation pixels (w)" operation is performed and then the image signal processed by the subtractor is sent to the display device which displays a left to right mirrored image; and
      in a case in which the switch does not receive the signal indicating the execution of image left to right mirroring, the processed image signal from the first divider is directly sent to the display device which displays an image which is not left to right mirrored;
      furthermore, the second mirror module includes a second divider, and the second divider receives the image signal and processes the image signal by performing an "arbitrary pixel vertical coordinate (y)/total number of vertical orientation pixels (h)" operation, then the second divider transfers to the display device the image signal processed by the second divider so that images received from the controller and displayed on the display device are not up-down mirrored.

2. The electronic imaging system of claim 1, wherein the image signal is transmitted from the transmission unit to the receiving unit by wireless transmission.

3. The electronic imaging system of claim 1, wherein the image signal is transmitted from the transmission unit to the receiving unit by wire transmission.

4. The electronic imaging system of claim 1, wherein the controller includes controlling units for controlling the camera lens and the left to right mirror module.

5. The electronic imaging system of claim 4, wherein the controlling unit include buttons, rotary knobs, and levers.

6. The electronic imaging system of claim 1, wherein the left to right mirror module is installed on the controller.

7. The electronic imaging system of claim 1, wherein the left to right mirror module is installed on the display device.

8. The electronic imaging system of claim 1, wherein the left to right mirror module is controlled by a hardware system for mirroring the image signal.

9. The electronic imaging system of claim 1, wherein the left to right mirror module is controlled by a software system for mirroring the image signal.

10. The electronic imaging system of claim 1, wherein the dividers in the first mirror module and the second mirror module are array dividers.

* * * * *